(12) United States Patent
Brice et al.

(10) Patent No.: US 11,743,681 B2
(45) Date of Patent: *Aug. 29, 2023

(54) SYSTEM FOR LOCATING REMOTE OBJECTS

(71) Applicant: LINKTRAK LICENSING, LLC, Ormond Beach, FL (US)

(72) Inventors: David G. Brice, Santa Monica, CA (US); Curtis L. Carrender, Morgan Hill, CA (US)

(73) Assignee: LINKTRAK LICENSING, LLC, Ormond Beach, FL (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/147,166

(22) Filed: Jan. 12, 2021

(65) Prior Publication Data

US 2021/0136524 A1 May 6, 2021

Related U.S. Application Data

(63) Continuation of application No. 16/140,216, filed on Sep. 24, 2018, now Pat. No. 10,917,744, which is a (Continued)

(51) Int. Cl.
*H04W 4/02* (2018.01)
*G08B 21/02* (2006.01)
(Continued)

(52) U.S. Cl.
CPC ........ *H04W 4/023* (2013.01); *G08B 21/0294* (2013.01); *G08B 3/10* (2013.01);
(Continued)

(58) Field of Classification Search
CPC .... H04W 4/023; H04W 4/80; G08B 21/0294; G08B 21/025; G08B 21/0261;
(Continued)

(56) References Cited

U.S. PATENT DOCUMENTS 6,297,737 B1 10/2001 Irvin
6,769,767 B2 8/2004 Swab et al.
(Continued)

FOREIGN PATENT DOCUMENTS

DE 102008037373 A1 3/2010
JP 2006-227936 A 8/2006
(Continued)

OTHER PUBLICATIONS

International Search Report and Written Opinion dated Oct. 20, 2015, for corresponding International Application No. PCT/US2015/039802, 11 pages.
(Continued)

*Primary Examiner* — William Nealon
(74) *Attorney, Agent, or Firm* — SEED INTELLECTUAL PROPERTY LAW GROUP LLP

(57) ABSTRACT

A system for locating remote objects and for directing users to remote objects, and for tracking remote objects such as eye glasses, watches, and the like, the system including an RFID transponder physically connected to the object, and RFID interrogator configured to interrogate the RFID transponder and receive a signal in response thereto, and a portable electronic device in electronic communication with the RFID interrogator and configured to process the received signal and determine a location of the object relative to the RFID interrogator and to provide information to a user regarding the location of the object.

11 Claims, 4 Drawing Sheets

Related U.S. Application Data continuation of application No. 15/325,249, filed as application No. PCT/US2015/039802 on Jul. 9, 2015, now abandoned.

(60) Provisional application No. 62/023,092, filed on Jul. 10, 2014.

(51) Int. Cl.
*G08B 6/00* (2006.01)
*H04W 4/80* (2018.01)
*G08B 3/10* (2006.01)

(52) U.S. Cl.
CPC .............. *G08B 6/00* (2013.01); *G08B 21/025* (2013.01); *G08B 21/0261* (2013.01); *G08B 21/0275* (2013.01); *G08B 21/0277* (2013.01); *H04W 4/80* (2018.02)

(58) Field of Classification Search
CPC .. G08B 21/0275; G08B 21/0277; G08B 6/00; G08B 3/10
USPC ...................................... 455/456.1
See application file for complete search history.

(56) References Cited

U.S. PATENT DOCUMENTS

| 8,253,559 | B2 | 8/2012 | Howard et al. |
| 8,289,159 | B2 | 10/2012 | Julian et al. |
| 8,810,392 | B1* | 8/2014 | Teller ................ G08B 21/24 |
| | | | 340/572.1 |
| 2003/0034887 | A1* | 2/2003 | Crabtree ................ G01S 3/54 |
| | | | 340/568.1 |
| 2005/0134459 | A1* | 6/2005 | Glick ................ G08B 25/009 |
| | | | 340/572.1 |
| 2008/0111678 | A1 | 5/2008 | Mizoguchi et al. |
| 2008/0143482 | A1* | 6/2008 | Shoarinejad ........... G01C 21/00 |
| | | | 340/8.1 |
| 2009/0088077 | A1* | 4/2009 | Brown ................ H04B 5/0037 |
| | | | 340/572.1 |
| 2009/0232356 | A1* | 9/2009 | Schwartz ........... G08B 21/0227 |
| | | | 382/103 |
| 2012/0169990 | A1 | 7/2012 | Burnstein |
| 2012/0229280 | A1 | 9/2012 | Westerlund et al. |
| 2012/0282976 | A1 | 11/2012 | Suhami |
| 2013/0080049 | A1 | 3/2013 | Brucker et al. |
| 2013/0234853 | A1* | 9/2013 | H. Kazerouni .... G06K 7/10297 |
| | | | 340/572.1 |
| 2013/0342805 | A1 | 12/2013 | Huang |

FOREIGN PATENT DOCUMENTS

| JP | 2008-146640 A | 6/2008 |
| KR | 10-0718531 B1 | 5/2007 |

OTHER PUBLICATIONS http://www.appbank.net/2013/07/25/iphone-application/641747.php (commonly known technique) 7 pages.

https://gigazine.net/news/20130528-button-trackr/ (commonly known technique) 15 pages.

Japanese Office Action with English Translation dated Apr. 9, 2019, for corresponding JP Application No. 2017-522456, 9 pages.

* cited by examiner

SYSTEM FOR LOCATING REMOTE OBJECTS

BACKGROUND

Technical Field

The present disclosure is directed to wireless assistive communication systems and, in particular, to a radio frequency identification system in combination with a mobile device that directs a user to the location of a tagged object.

Description of the Related Art

There exist today several devices that can be used to help find items by transmitting a signal to a base station of some type. For example, there are transmitter devices the size of a matchbox or larger that can be attached to an item. Subsequently, that item can be located by using the signal from the transmitter. An example might be adding one of these devices to your key ring. When house or automobile keys are lost, they can be more easily located by using the RF signal that is transmitted from the device attached to the keys. These devices are known in the art as "transponders" or "tags." These tags often operate in the 2450 MHz band under the rules of the Bluetooth Low Energy, BLE, spectrum and allowance. The prior approaches are basically a simple design using BLE tags to help in finding common day objects most often misplaced during the busy day to day activities.

A Bluetooth tag is just one of many devices using this spectrum. The proliferation of Bluetooth enabled devices has allowed additional capability for Bluetooth enable Smart Phones. The Bluetooth link enables wireless earpieces, wireless speakers, and a host of connectivity options where short range, and lower speed data can be transferred to or from the Smart Phone. Tags using Bluetooth are becoming more predominant. Two examples are the companies Reveal Labs with their Tile™ product line, and StickNFind™. FIG. 1 illustrates an example of a Tile™ product 20 on a piece of luggage 30. This product is designed to communicate with portable electronic devices, such as a cell phone having application software that displays range and distance information to the product 20. The product 20 can include a remotely activated speaker to assists in locating the product 20 by sound. A drawback to this product 20 is its size, which limits its application to larger objects and makes it unsuitable for smaller articles such as eye glasses.

U.S. Pat. No. 6,297,737 describes a locating unit that includes a wireless communications interface for transmitting signals to one or more locating tags. A user physically associates each tag with an item of interest, such as a briefcase or key ring. When a tagged item is misplaced, the user uses the locating unit to find it. The user selects the desired item from a listing of tagged items, and based on the user selection, the locating unit polls the associated tag. The polled tag responds by emitting an audible signal, thereby aiding the user in determining its location. Preferably, the locating unit is a mobile terminal with two-way communications wherein a polled tag returns a found signal to the mobile terminal in response to being polled. The mobile terminal provides the user with found/not-found indication, from which the user can ascertain whether the desired tagged item is within range of the polling signal, even if the tag's audible signal cannot be heard. Tags preferably include a switch that, when actuated, causes the tag to poll the mobile terminal. In response to receiving a poll signal from a tag, the mobile terminal emits an audible signal and returns a found signal to the polling tag. The polling tag provides the user with a found/not-found indicator. Thus, individual tags can be used to locate the mobile terminal. Preferably, the wireless interfaces in the mobile terminal and locating tags are Bluetooth transceivers. This patent fails to teach or suggest providing more than an audible indication and would thus be useless to the deaf or hard of hearing, especially when trying to locate a hearing aid.

U.S. Pat. No. 6,769,767 provides a wireless ad hoc pico network that is formed by eyewear and other devices such as a computer, a bracelet, and a telephone having similar transceivers mounted on them, as well as other devices, such as a radio, a CD player, a hand held global positioning satellite system and a heart rate monitor. The transceivers operate on globally available, unlicensed radio band, 2.45 gigahertz (GHz) and conform to the Bluetooth standard. The eyewear includes a frame and connected to the frame are two temples that have a male portion of a connector incorporated in them. A female portion of the connector is made integral with the hinges. When the male portion is inserted in the female portion the temple is attached to the frame. The temple may have co-molded within its body an apparatus such as an audio device, a camera, a speaker, and a microphone, and a display device such as liquid crystal or an alarm. This patent requires special manufacturing of the eyeglasses and fails to address the issue of providing sufficient electrical energy storage for the operation of the temple mounted devices.

U.S. Pat. No. 8,253,559 uses a wireless locating device that includes a user interface which generates a first location request signal in response to an indication from a user to locate a handheld wireless communication device. A short-range wireless transmitter transmits a first RF paging signal in response to the location request signal. An adjunct device is coupled to the handheld wireless communication device via a communication port. The adjunct device emits a first detectable alert signal in response to the first RF paging signal to assist the user in locating the handheld wireless communication device. This device fails to serve the needs of those who are deaf or hard of hearing.

U.S. Patent Publication No. 20030034887 provides an object locator system for locating objects such as people, pets, and personal articles. A transceiver is attached to the person, animal, or item to be tracked and a handheld locator device is employed to transmit a locator signal containing an address code to the transceiver. Upon receipt of a signal, the transceiver compares the address code contained in the locator signal with an address code stored in the transceiver. If the two codes are same, the transceiver sends a return signal back to the locator device. The locator device uses this return signal to determine the distance and direction of the transceiver from the user's location. A user can select from a multiple number of items to locate and allows multiple users to search for different articles within the same general area without interference. If the user wishes to search for the glasses, he can scroll down on the screen to select a particular pair of glasses. A search signal will then be sent that includes the corresponding address code. There is no suggestion of how to incorporate Bluetooth technology into the glasses, including sufficient battery storage capacity.

U.S. Patent Publication No. 20130342805 describes multi-functional eyeglasses, which includes two lenses and an eyeglass frame including two supporting rods and two lens frames; each lens frame being installed with a respective one of the lenses. The multi-functional eyeglasses have a processor, a memory and a display. The eyeglasses can be installed with a receiver and a transmitter, a GPS positioning system, a Bluetooth system, a camera, a sound control system, a TV circuit, a scanner, a clinical thermometer, a thermometer, a batter, a solar energy chip, USP plugs, switching set. However, this publication fails to teach or suggest the issue of providing sufficient battery capacity to power the Bluetooth technology when mounted in the eyeglasses.

BRIEF SUMMARY

The present disclosure provides a system for locating remote objects, for directing users to remote objects, and for tracking remote objects. In one form, the system includes an RFID transponder physically connected to the object, an RFID interrogator configured to interrogate the RFID transponder and receive a signal in response thereto, and a portable electronic device in electronic communication with the RFID interrogator and configured to process the received signal and determine a location of the object relative to the RFID interrogator and to provide information to a user regarding the location of the object. Bluetooth technology is employed for wireless communication and includes a battery with sufficient storage capacity for enhanced operation.

In accordance with one aspect of the present disclosure, an identification system for locating and tracking remote objects is provided that includes a Bluetooth Low Energy (BLE) tag that is small enough to fit inside and to be used in at least one from among a pair of glasses, an eyeglass lanyard, and a small end piece attachment for eyeglasses. Other objects to be tracked or located or both include watches, phones, jewelry, remote controls, keys and key chains, purses, wallets, and other personal items of value to the owner or user. Ideally in some instances a battery is provided with the tag that can be recharged in a wireless or contact manner.

In accordance with another aspect of the present disclosure, a cell phone application for use with cell phones is provided that incorporates Bluetooth communications that allows users to easily find their lost eyeglasses by one or more of (a) vectoring to the eyeglass location by signal strength indicated in a graphical manner, (b) vectoring to their eyeglass location using audible feedback, and (c) vectoring to their eyeglass location by using location information derived from other devices. In accordance with a further aspect of this design, users are notified when eyeglasses are moving beyond a set threshold distance from the cell phone.

The present disclosure relates to locating and tracking lost objects using RFID technology, particularly eye glasses. More specifically, miniaturized Bluetooth technology is employed to tag at least one from among a pair of glasses, an eyeglass lanyard, and a small end piece attachment for eyeglasses. A cell phone application is utilized to communicate with the tag for location and tracking services. The cell phone application also displays the information to the user in a variety of formats, including visual, aural, and tactile. For example, spoken directions can help the user walk to where the glasses are located.

The cell phone application incorporates Bluetooth communications that allows users to easily find their lost eyeglasses. In accordance with a further aspect of the present disclosure, users are notified when eyeglasses are moving beyond a set threshold distance from the cell phone.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings, wherein.

DETAILED DESCRIPTION

Figure 1:
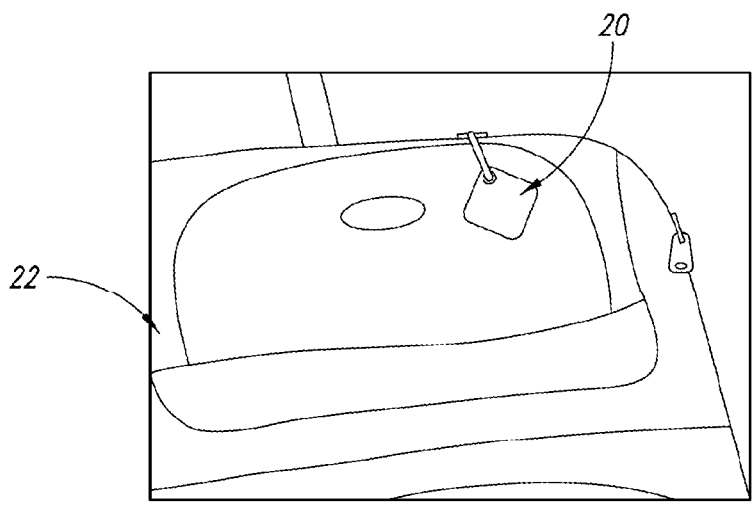
FIG. 1 illustrates a known BLE device associated with a piece of luggage.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with eye glasses, cell phones, charging stations, and radio frequency transponders and interrogators have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Although locating a misplaced wallet, purse or cell phone are good examples of the benefits of existing technology, these small items are not the most typical use case. More importantly, the vast majority of small objects that get misplaced cannot benefit from the existing technologies as a result of limited read range and large tag size. Cars keys and eye glasses are the most often misplaced objects, and existing designs do not adequately offer a solution that is small enough to be useful. The majority of current applications where a finder or beacon type tag is used can be implemented more efficiently using a much smaller tag. As one of the largest portions of existing design is the battery, the present disclosure utilizes an electrical storage device with a much smaller battery that is rechargeable. In general, the size is approximately 3×4×11 mm. The size is based on the use of BLE chips, small resonators and the smallest available batteries. This size is also based on the size of the object to be located and tracked. Ideally, the battery is commercially available, such as a Lithium Ion battery that is approximately 2 mm×4 mm×2 mm. The battery can be attached to an existing pair of eyeglasses, such as with a sleeve on the temple pieces, or the battery or batteries may be integrally formed therewith using existing technology. The charge and voltage of the batteries will be determined by the amount of current draw in the tag on the glasses as well as any optional devices, such as a display (light, screen, etc.) or an audible device such as a speaker, buzzer, bell or the like.

Figure 2:
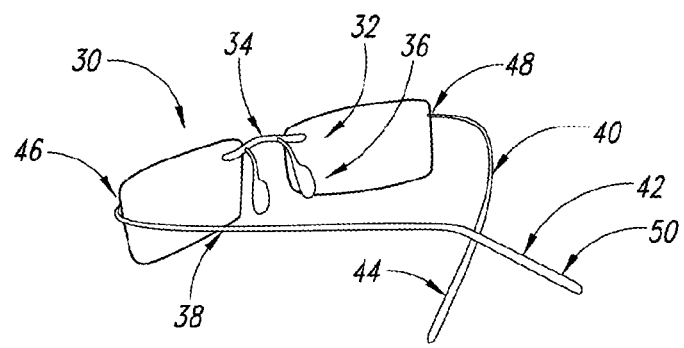
FIG. 2 is an illustration of a BLE enabled pair of eyeglasses formed in accordance with the present disclosure.

FIG. 2 is an example of a well-known article that is frequently misplaced and at times difficult to locate—eyeglasses 30. Most eyeglasses 30 utilize a pair of lenses 32, typically mounted in a frame (not shown in this design) and attached together by a bridge 34. Extending from the bridge 34 are a pair of nose pads 36 configured to rest on a user's nose; and extending from the left and right sides of the pair of lenses are left and right temple pieces 38, 40, with respective left and right tips 42, 44 configured to rest on the user's ear. The temple pieces 38, 40 are attached to the lenses 32 by respective left and right hinges 46, 48 that enable the temple pieces 38, 40 to fold towards and away from the lenses 32.

Also shown in FIG. 2 is a wireless BLE tag 50 affixed or integrally formed on the left temple tip 42. It is to be understood that the tag 50 can be associated instead with the right temple tip 44. Ideally the tag 50 extends upward from the tip 44 so as to avoid touching the user's ear when the glasses are worn. As can be seen, the tag 50 is small enough to be part of the temple tip 42. The tag 50 may be integrally incorporated into one or more of the frame of the eyeglasses 30, or the temple tip 42, 44 of the eyeglasses 30. It can be both integral, i.e. inserted as part of the manufacture, or placed in a required indentation or recess of the earpiece of the glasses. In addition it can be retrofit to the glasses earpiece at the end of the arm, in the form of a slip-on or elasticized sheath or sleeve. For example, in a retrofit application, a sleeve containing the tag 50 is configured to be slipped over the temple tip 42 of the eyeglasses 30. Alternatively, the tag 50 may be attached to or incorporated into a lanyard for the eyeglasses 30.

Simply shrinking existing technology is not the basis for the uniqueness and non-obviousness of the present disclosed device and system. In this design, the BLE tag 50 is preferably rechargeable, such as with an inductive coupling or contact to a charging device that is not shown. In addition, the tag 50 can be configured to operate with one or more of the following features: (a) without a full duplex operation (just a transmitter), (b) with a motion sensor that has a different operational cycle based upon time of movement, (c) an internal real-time clock having an operational cycle that can be configured, (d) an internal real-time clock having an operational cycle based upon the time of day, and (e) an internal real-time clock and a motion sensor having an operational cycle that is self-configuring.

The tag 50 can also be configured to be read only by the end user or it can be configured to be read by others who use this information to upload information about a found object to a central web page or to an email of an end user's choice. Alternatively, the tag 50 is configured to transmit a video picture to a host computer based upon object movement parameters and user preferences. In accordance with another aspect of the present disclosure, a pin light is utilized in the same location on the earpiece as a locater, and it is configured to provide a visual communication to the user.

In applications in which a cell phone is used, a Graphical User Interface (GUI), such as via application software ("app") is provided that is configured to provide one or more of the following functionalities: (a) to give historical location information for the object up until the last point of contact, (b) to provide notification to individuals that the object is moving into or out of range of the interrogator, (c) to provide notification about the object using voice commands or variable audible tones.

In another aspect of the present disclosure, the small rechargeable, wireless tag 50 is configured to capture and upload an image of a location of an object based upon predefined movement parameters of the object or predefined signal strength measurements taken by the device. This tag 50 may also be configured to operate by uploading wireless-based signal strength information related to a location based upon predefined movement parameters.

A computer pad can be provided that includes a GUI that is configured to notify a central control, such as a hospital or nursing home station, that the object is moving out of range of the interrogator. The computer pad can be a personal communication device that comprises one from among a cell phone, a tablet computer, a laptop computer, and a PDA.

Figure 3:
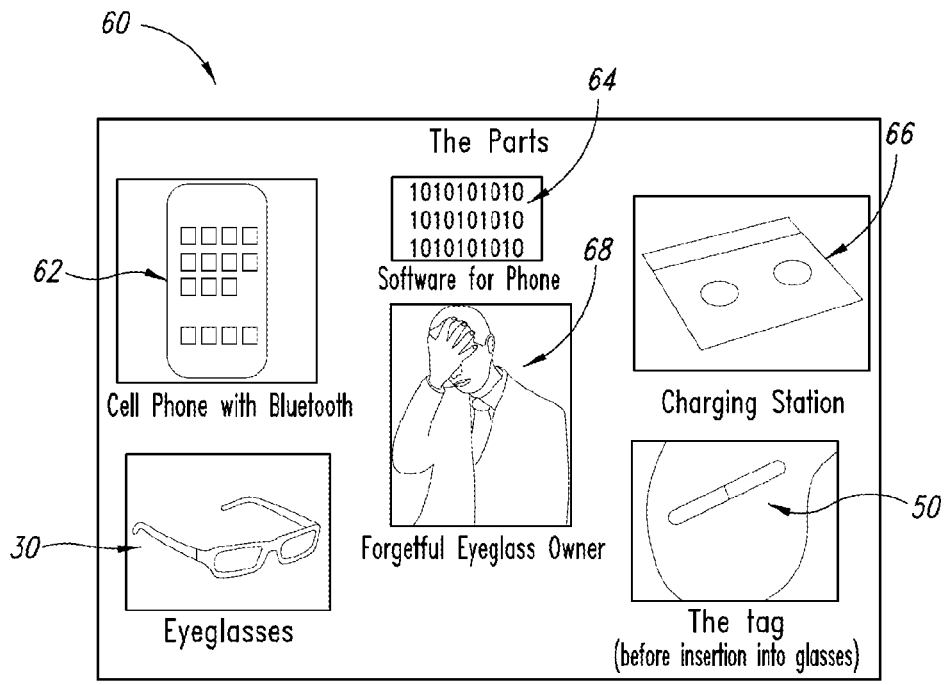
FIG. 3 illustrates an assembly of components that constitute one aspect of a system formed in accordance with the present disclosure.

Referring next to FIG. 3, shown therein is a system 60 formed in accordance with the present disclosure. As shown, the system includes the eyeglasses 30 described above, the tag 50, a cell phone 62 and software 64 for the cellphone 62, and a charging station 66 for charging the battery associated with the tag 50. Of course, the "forgetful eyeglass owner" or user 68 is the beneficiary of the device and system of the present disclosure. The cell phone includes a computing device such as a microprocessor, ASIC, microcomputer, or other similar electronic signal processing device. It is designed to provide location signals for use in locating the desired object. Ideally the processing device is configured to the processor is configured to provide a further indication to the user of at least one from among historical location information for the object up until a last point of contact, that the object is moving out of range or into range of the radio frequency interrogator interrogation signal, and that an item of interest belonging to someone other than the user is moving into range of the radio frequency interrogator interrogation signal. In addition, the processor is configured to provide a further indication to the user of at least one from among historical location information for the object up until a last point of contact by uploading that information to a network which is available to the end user or those authorized by the end user. Such a network would include without limitation the Internet, a local intranet, and other forms of interconnection or intercommunication, wireless or hard wired, optical or infrared.

Figure 4:
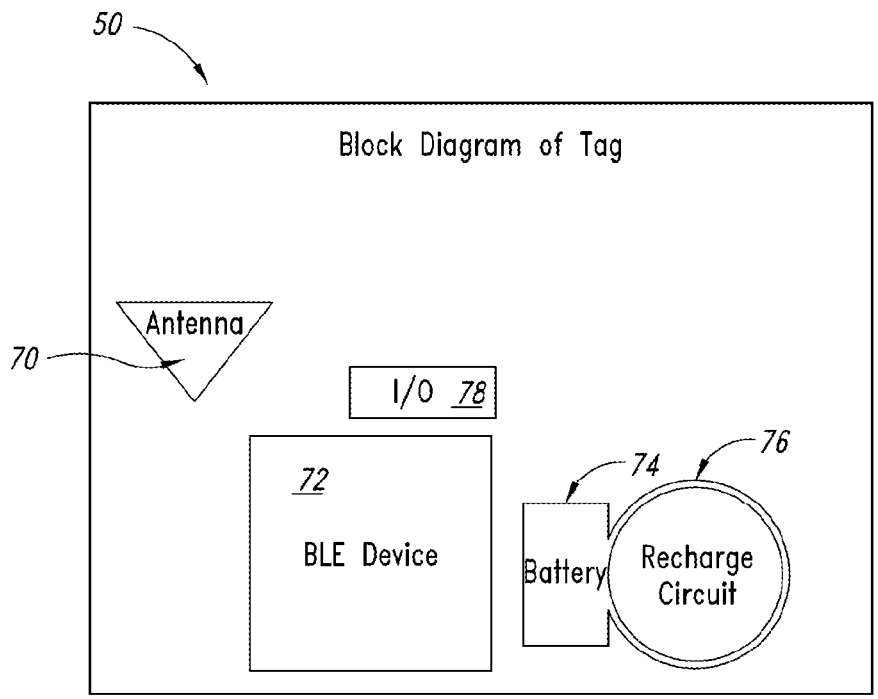
FIG. 4 is a block diagram of a tag formed in accordance with the present disclosure.

FIG. 4 shows a block diagram of the tag 50 to include an antenna 70, and BLE module 72, a battery 74 with recharging circuit 76, and an optional Input-Output (I/O) device or circuit 78. The BLE module 70 may have an internal or external CPU and may have internal or external crystals and additional components. The I/O 78 is optional, depending on the desired features to be implemented. These features may include motion detection, magnetic field detection, a speaker or microphone, a camera, an IR diode, or an IR diode detector. The charger 76 may be wireless, such as an inductive loop, for non-contact charging via the charging station 66 or it may be a contact type design with the charging station 66, or it may be a combination of the foregoing.

Figure 5:
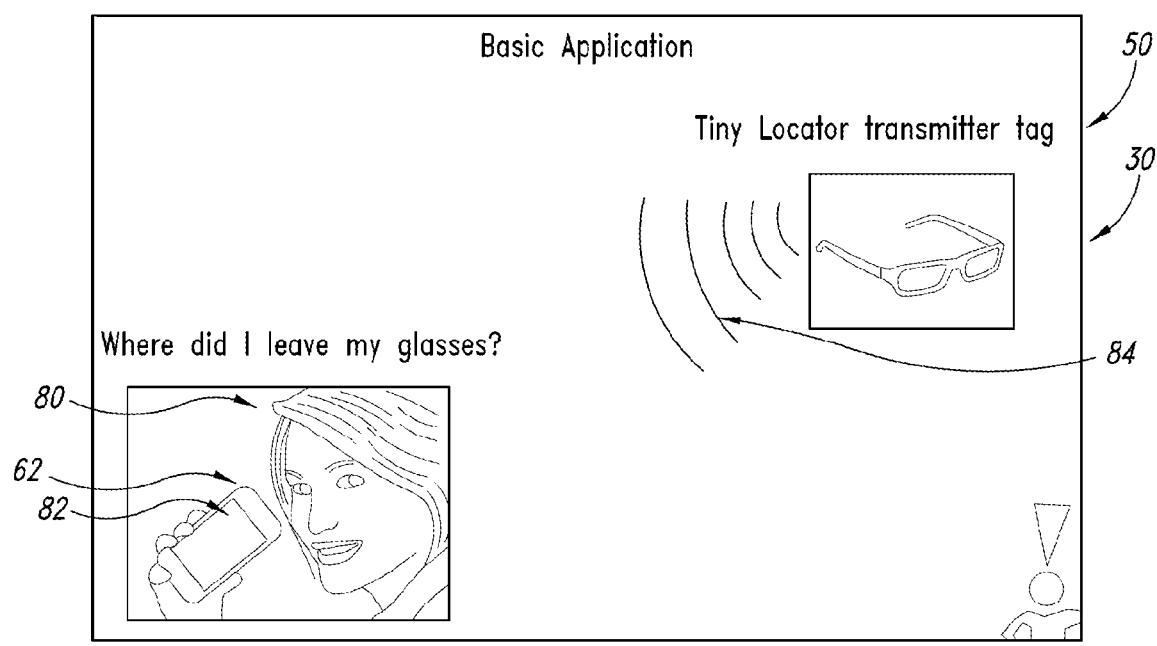
FIG. 5 is an illustration of a basic application of the system of the present disclosure.

FIG. 5 illustrates a basic application of the foregoing system 60 utilizing the technical improvements of the present disclosure. The glasses 30 include the tag 50 that are configured with the BLE module to respond to interrogation signals from the cell phone 62. The user 80 inputs a request into the cell phone 62 using a GUI or app 64 previously loaded on the phone 62. Such a request can be entered manually, verbally, or via combinations of orientations of the phone. The phone 62 transmits an interrogation signal to the tag 50 on the glasses 30, which responds with a return signal 84. As shown in FIG. 5, the cell phone 62 screen displays the interface 82 in the form of a graphical display of an arrow pointing to the direction of the tag 50 in the glasses 30. Range indications can also be provided along with aural indications from the phone 62 or the glasses 30 or both.

Figure 6:
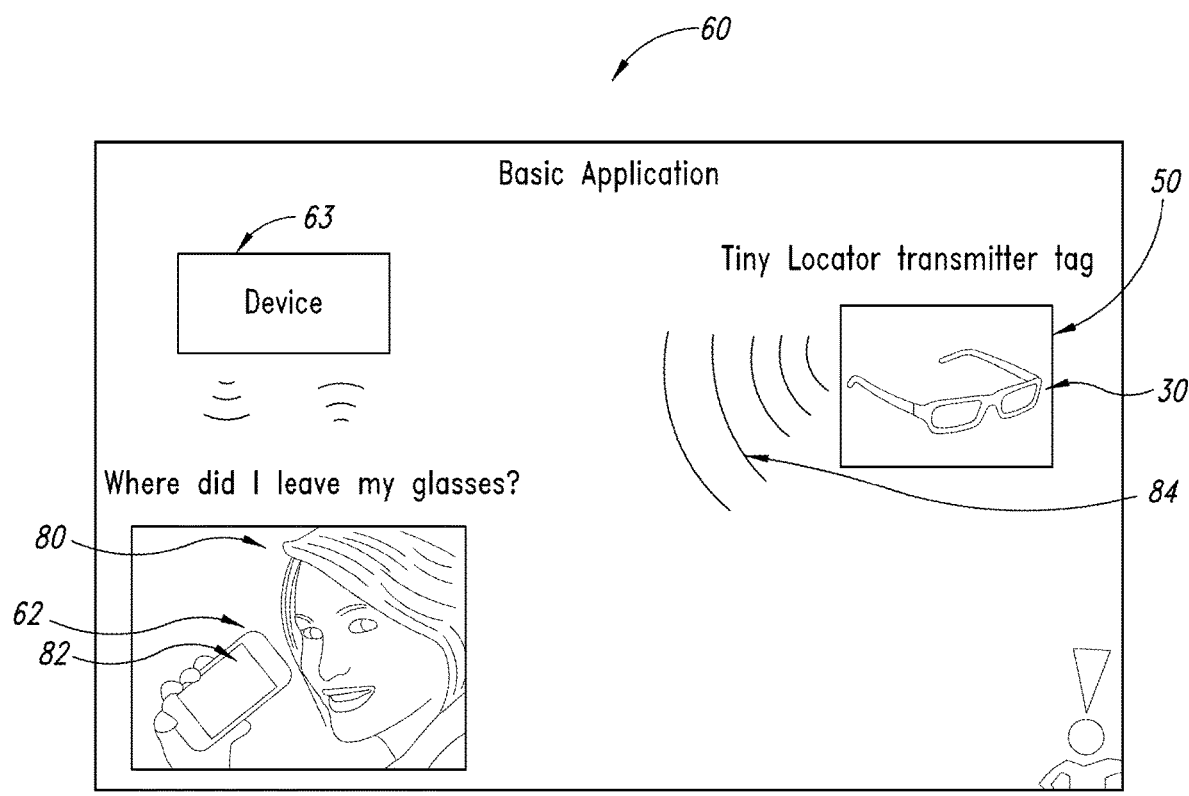
FIG. 6 is an illustration of an alternative implementation of the system of FIG. 5.

In accordance with one implementation of the system 60 shown in FIG. 6, a first communication device 50 is physically connected to the object 30 and capable of receiving radio frequency interrogation signals and sending a radio frequency response signal in response to the radio frequency interrogation signal. A second communication device 62 is provided that is capable of sending the radio frequency interrogation signal and receiving the radio frequency response signal 84 from the first communication device 50. A computing device 63 is electrically coupled to the second communication device 62 and capable of processing the received radio frequency communication signal and determining a location of the first communication device 50 and object 30 relative to the second communication device and providing at least one of a visual or aural indicator of the location of the object 30 to the user 80.

In an alternative implementation, the system for directing a user 80 to a remote object 30 includes a radio frequency transponder 50 physically connected to the object 30 and configured to receive an interrogation signal and to send a radio frequency response signal in response to the received radio frequency interrogation signal. A radio frequency interrogator 62 physically remote from the object 30 and is configured to transmit the interrogation signal and to receive the radio frequency response signal 84 from the transponder 50. And a portable electronic device 63 is electronically coupled to the radio frequency interrogator 62 and configured to process the radio frequency response signal to determine a location of the object 30 relative to the interrogator and to provide at least one of a visual, aural, and tactile indication to the user 80 of the relative location of the object 30.

In accordance with another aspect of the present disclosure, the system application is specific in its use, and it is unique to other location products in the market. It uses the smallest Bluetooth tag, known as the Bluetooth V4.1 Smart (Low Energy) Single mode module Sesub-Pan-D 14580. The specifications are as follows:

Space saving Ultra small package 3.5×3.5×1.0 mm (TYP) 0.5 mm pitch Solder Bumped BGA, 36 pins Able to communicate with and compatible with Bluetooth® Smart Ready application products ARM Cortex-M0 32 bit high performance microcontroller 32 kB OTP program memory, 84 kB ROM for BT stack 42 kB System SRAM, 8 kB Retention SRAM More freedom for design with antenna separate-layout The above tag or tag of similar size will combine with the world's smallest battery either independent of or on the same substrate. It is joined to effect a Bluetooth link to any cell phone in order to locate an item within 10-20 meters.

Ideally, the power source for the tag is a Harvard Lithium Ion battery. It is uniquely developed or formed using a 3D printer specially designed to manufacture a battery with the following comparative specifications:

Smallest battery (but not limited to) size is 2 mm×2 mm×0.4 mm

A total ink volume of 0.0016 mL (cathode+anode) is required for a cell (2 mm×2 mm×0.4 mm Battery capacity is as high as 150 mAh/g at 1 C discharge rate. There is only a small amount (0.001 g) of active material (cathode+anode) in these micro battery cells (2 mm×2 mm×0.4 mm). The calculated capacity of this cell is 0.15 mAh. This would increase with increasing cell size or number Current cells generate 3.2 volts These batteries come in a square of 2×2 c 0.3 $mm^3$ having 3.2V, and preferably Li-ion micro-battery construction or in the form of a ribbon 2×13×0.3 $mm^3$ having 3.2V, and preferably Li-ion micro-battery construction.

The Gen-2 Li-ion Micro-battery to be joined with the Micro Bluetooth tag as shown.

| | Gen-1 Li-ion Microbattery (Interdigitated Configuration) | Gen-2 Li-ion Microbattery (Laser Micromachining Configuration) |
|---|---|---|
| Maximum Cell Voltage | 1.8 V | 3.2 V |
| Capacity [Electrode Volume in the 1 × 1 mm active materials area] | [0.34 $mm^3$] | 1.7x < Gen-1 [0.2 $mm^3$] |
| Energy Density | | Slightly > Gen-1 due to higher cell voltage |
| Maximum Rate Performance | ~5 C | ~100 C |
| Anode Material | LTO | LTO |
| Cathode Material | LFP | LNMO |

It is to be understood that while a representative embodiment has been illustrated and described in the context of locating eye glasses, the present disclosure can be applied to other personal items of value to the owner or user, including without limitation keys and key chains, jewelry, watches, wallets, purses and handbags, remote controls, and the like.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for locating and tracking an object and providing an indication to a user of the location and movement of the object, the system comprising:

a transponder module connected to the object and configured to receive wavelengths of electromagnetic radiation and to send a responsive signal;

a communication device capable of wireless communications and comprising an interrogator remote from the object and configured to transmit wavelengths of electromagnetic radiation to the transponder and to receive the response signal from the transponder, and the communication device further comprising a processor configured to process the response signal and determine a location of the object and to provide an indication to the user of at least the location of the object, the indication comprising at least one from among a map showing the location of the object on the map, a visual display of the location as viewed from the communication device, a written indication of the location, an aural indication of the location, and a tactile indication of the location; and wherein the transponder module is configured to obtain signal strength measurements and to capture the location of the object based upon the signal strength measurements, and to upload wireless-based signal strength information related to the location based upon predefined movement parameters.

2. The system of claim 1 wherein the processor is configured to provide a further indication to the user of historical location information for the object up until a last point of contact.

3. The system of claim 1, wherein the communication device comprises a graphical user interface that is configured to provide a visual or aural indication to the user of at least one from among historical location information for the object up until a last point of contact, that the object is moving out of range or into range of the interrogator interrogation signal, and that an item of interest belonging to someone other than the user is moving into range of the interrogator interrogation signal.

4. The system of claim 1, wherein the communication device comprises a graphical user interface that is configured to provide a visual or aural indication to the user of historical location information for the object up until a last point of contact by uploading that information to a network which is available to the end user or those authorized by the end user.

5. The system of claim 1 further including a central control and wherein the communication device comprises a graphical user interface that is configured to notify the central control that the object is moving out of range of the interrogator.

6. The system of claim 1 wherein the transponder module comprises a central processing unit and an input/out coupled to a motion detector to detect movement of the object.

7. The system of claim 6 wherein the transponder module is coupled to a speaker or microphone.

8. The system of claim 6 wherein the transponder module is coupled to a camera.

9. A system for locating and tracking an object and providing an indication to a user of the location and movement of the object, the system comprising:
 a transponder module connected to the object and including a transponder configured to receive wavelengths of electromagnetic radiation and to send a responsive response signal, the transponder module powered by at least one from among a battery, wavelengths of electromagnetic radiation, or a combination thereof, the battery having a capacity of 0.15 mAh per cell generating voltage in the range of 1.8V to 3.2V and a size in the range of 2 mm×2 mm×0.3 mm to and including 2 mm×2 mm×0.4 mm; and
 a communication device capable of wireless communications and comprising an interrogator remote from the object and configured to transmit wavelengths of electromagnetic radiation to the radio transponder and to receive the response signal from the transponder, and further comprising a processor configured to process the response signal and determine a location of the object and to provide an indication to the user of at least the location of the object, the indication comprising at least one from among a map showing the location of the object on the map, a visual display of the location as viewed from the communication device, a written indication of the location, an aural indication of the location, and a tactile indication of the location, the personal communication device comprising a graphical user interface that is configured to display an arrow pointing in the direction of the object, wherein the communication device is configured to determine a range between the communication device and the object, and the graphical user interface is configured to display the range to the user.

10. A system for locating and tracking an object and providing an indication to a user of the location and movement of the object, the system comprising:
 a transponder module connected to the object and including a transponder configured to receive wavelengths of electromagnetic radiation and to send a responsive response signal, the transponder module powered by at least one from among a battery, wavelengths of electromagnetic radiation, or a combination thereof; and
 a communication device capable of wireless communications and comprising an interrogator remote from the object and configured to transmit wavelengths of electromagnetic radiation to the radio transponder and to receive the response signal from the transponder, and further comprising a processor configured to process the response signal and determine a location of the object and to provide an indication to the user of at least the location of the object, the indication comprising at least one from among a map showing the location of the object on the map, a visual display of the location as viewed from the communication device, a written indication of the location, an aural indication of the location, and a tactile indication of the location, the personal communication device comprising a graphical user interface that is configured to display an arrow pointing in the direction of the object, wherein the communication device is configured to determine a range between the communication device and the object, and the graphical user interface is configured to display the range to the user;
 a central control, and
 wherein the transponder is configured to obtain signal strength measurements and to capture the location of the object based upon the signal strength measurements, and to upload wireless-based signal strength information related to the location based upon predefined movement parameters.

11. The system of claim 10 wherein the communication device is further configured to upload an image of a location of the object based upon the signal strength measurements.

* * * * *

UNITED STATES PATENT AND TRADEMARK OFFICE
CERTIFICATE OF CORRECTION

| | |
|---|---|
| PATENT NO. | : 11,743,681 B2 |
| APPLICATION NO. | : 17/147166 |
| DATED | : August 29, 2023 |
| INVENTOR(S) | : David G. Brice et al. |

It is certified that error appears in the above-identified patent and that said Letters Patent is hereby corrected as shown below:

In the Claims

Column 10, Claim 9, Lines 10-11:
"the personal communication device" should read: --the communication device--.

Column 10, Claim 10, Lines 41-42:
"the personal communication device" should read: --the communication device--.

Signed and Sealed this
Third Day of October, 2023

Katherine Kelly Vidal
*Director of the United States Patent and Trademark Office*